Figure 1:
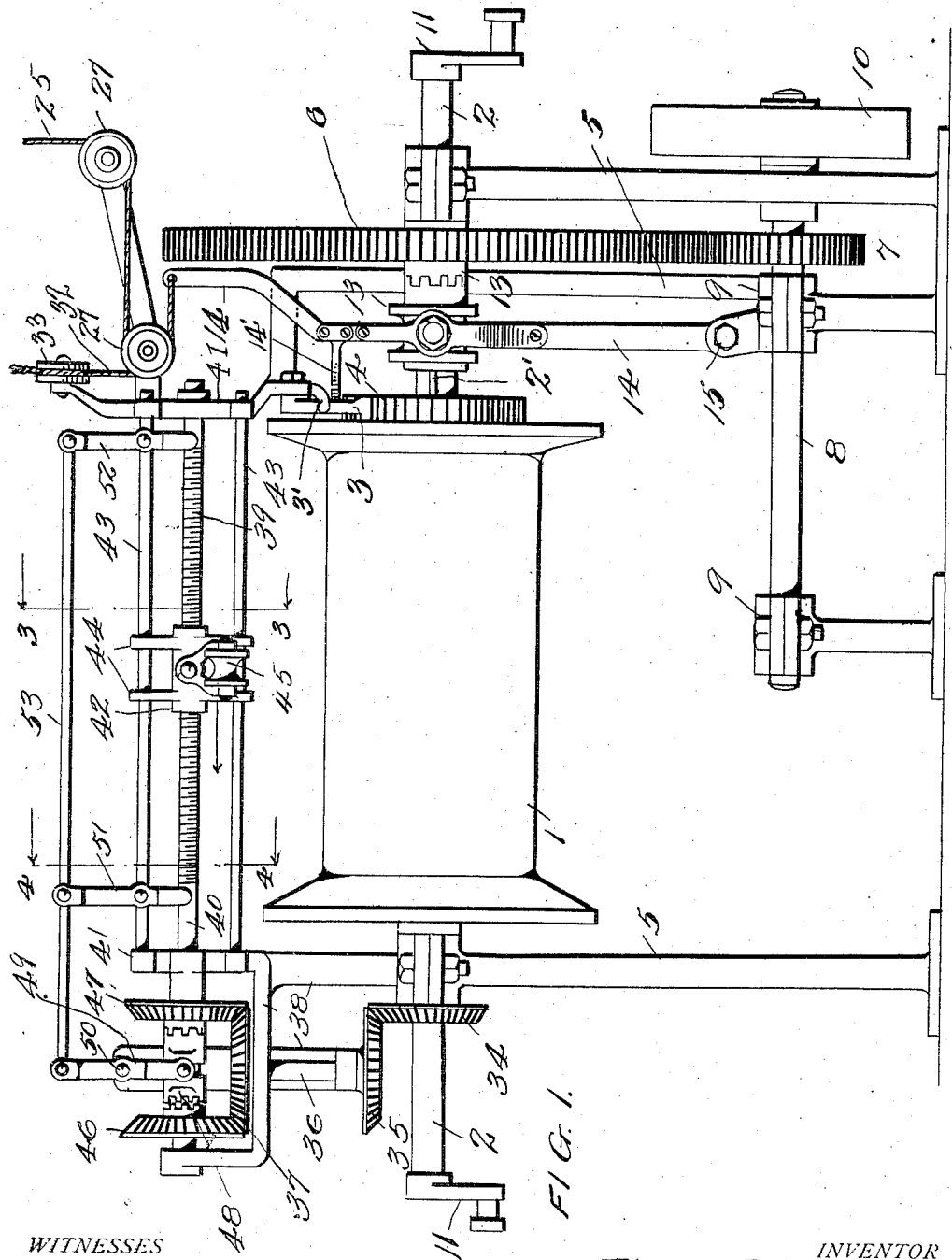

T. F. TALLON.
WINDLASS FOR HAY FORKS.
APPLICATION FILED JUNE 19, 1911.

1,038,800.

Patented Sept. 17, 1912.

2 SHEETS—SHEET 1.

WITNESSES
C. K. Davies.
E. A. Jordan.

INVENTOR
Thomas F. Tallon
By Thomas N. Harner
Attorney

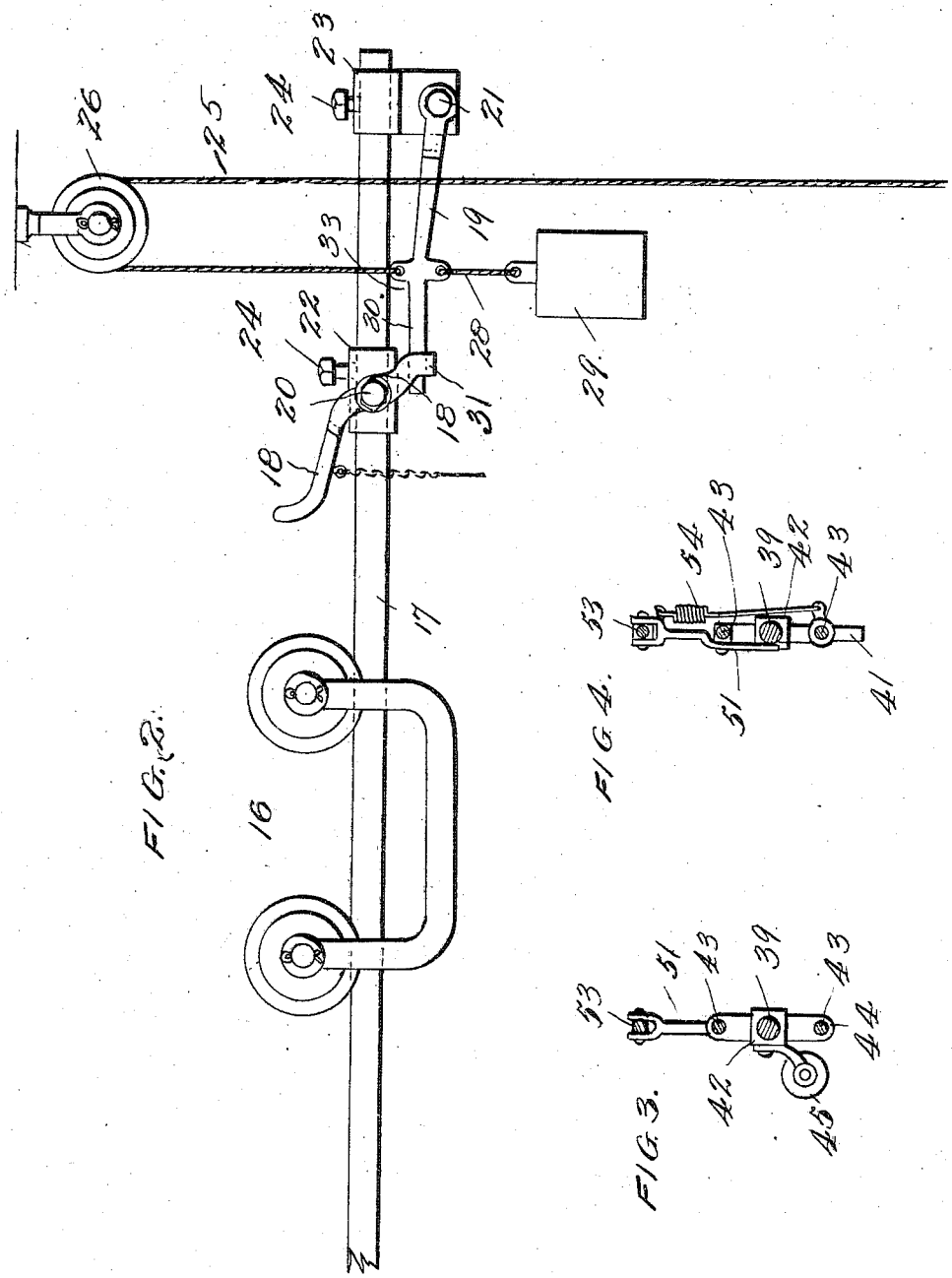

UNITED STATES PATENT OFFICE.

THOMAS F. TALLON, OF MARYVILLE, MISSOURI.

WINDLASS FOR HAY-FORKS.

1,038,800.   Specification of Letters Patent.   Patented Sept. 17, 1912.

Application filed June 19, 1911. Serial No. 633,914.

*To all whom it may concern:*

Be it known that I, THOMAS F. TALLON, a citizen of the United States, residing at Maryville, in the county of Nodaway and State of Missouri, have invented certain new and useful Improvements in Windlasses for Hay-Forks, of which the following is a specification.

The present invention relates to an improved windlass for hay forks, and is designed and adapted for many other purposes for use on a farm.

The object of the invention is the provision of an improved machine, which is comparatively cheap in first cost, inexpensive to maintain, and simple in operation, and will adapt itself for many uses.

The invention consists in a hoisting windlass mechanism fitted with means actuated from a hay fork or carrier, which automatically stops the winding of the drum, and also permits the drum to run free to lower a suspended load, it being understood of course that the load is suspended from a rope adapted to be wound upon the drum for hoisting and lowering.

In the accompanying drawings I have illustrated one example of the physical embodiment of my invention constructed according to the best mode I have so far devised for the practical application of the principles.

Figure 1 is a front elevation of a machine embodying the novel features of my invention. Fig. 2 illustrates a detached portion of the invention in Fig. 1, illustrating a portion of a hay carrier to show its relation with the invention. Fig. 3 is a detail section on line 3—3 Fig. 1 and Fig. 4 is a similar view on line 4—4 Fig. 1.

As herein described and illustrated on the drawings the invention is adapted as a hoisting device for hay carriers, and will be so referred to hereinafter, but it will be understood that the machine is adapted for other purposes, which are at this time unnecessary to enumerate.

The winding drum 1 is keyed upon the counter shaft 2, by means of the feather or spline 2', and is provided with the usual release mechanism, as a pawl 3 and ratchet wheel 4 to prevent back winding or unwinding, except when desired. The counter shaft is journaled in the frame 5, and is driven through the medium of the large gear wheel 6 and the small pinion 7, the latter journaled on the main shaft 8, that is supported in bearings 9 and may be driven from the drive pulley 10. As shown in Fig. 1, the ends of the shaft 2 are equipped with cranks 11 which adapts the shaft as the actuating means for a pump.

The winding drum may be thrown into gear and rotated by means of the clutch and spool 13, the latter being free to slide on the shaft and key and moved through the medium of the lever 14, which is pivoted at 15 to the main shaft supporting frame. The clutch may be moved into and out of engagement by hand by manually moving the lever. It is also actuated by the automatic mechanism illustrated in Fig. 2. The automatic clutch operating mechanism is actuated by means of the hay carrier, a portion of which is shown at 16 in Fig. 2, wherein the carrier is shown supported and adapted to travel upon the track 17. The clutch actuating mechanism is supported upon the track and comprises a pair of levers 18 and 19, the former pivoted at 20 and the latter at 21. These levers are adjustable upon the track by means of the castings in the form of sleeves 22 and 23 respectively, and when moved to proper adjusted position are held by means of the set screws 24.

A pull cord 25, which is attached to the actuating lever 14, is passed over the pulley 26, which may be suspended from a beam in the barn, and also over the idler pulleys 27. The upper end of the cord is attached to the lever 19, and a short section of cord 28 is employed to suspend the weight 29 from said lever.

In the position illustrated in Fig. 1 with the clutch in engagement with the winding drum, the levers 18 and 19 are held locked by the engagement of the end 30 of lever 19 which is retained in the recessed end 31 of lever 18. Now, assuming the hay carrier to be moving toward the actuating mechanism, when the carrier has traveled the required distance, one of the wheels contacts with the lever 18, and moves the lever on its pivot. This movement disengages the parts 30 and 31; the weight pulls down on lever 19, and with it draws on the cords 25, 28, and the cord 25 pulls the lever 14 over, thus withdrawing the clutch members from engagement. The rotative power is thus withdrawn from the winding drum. In addition to the movement of lever 14 due to action of weight 29 as means for disengaging the pawl 3 from ratchet 4; this may be accomplished by means of a pull cord 32 (Fig. 1) which is passed over pulley 33, and when pulled by the operator disengages the pawl, by the action of the curved lever arm 14', which is rigid with lever 14, and as said lever is further moved by pull on rope 32, it rides across the pawl 3 at the rear end by its frictional contact lifts the pawl from the teeth of the ratchet wheel, the flat spring 3' acting to return the pawl when the lever arm is withdrawn.

I also equip my winding drum with means for guiding the rope, as it winds upon the drum. Upon the end of the countershaft 2, I fix the bevel gear 34, which meshes with a similar gear 35 rotatable with the shaft 36. At the upper end of the stud shaft 36 a third bevel gear 37 is journaled, the parts being supported in the frame 38. The frame 38 also supports the rope guiding worm 39, which is preferably a threaded bar or shaft 40, journaled in the two brackets 41. The rope guide 42 is a metallic casting, interiorly threaded, and adapted to travel upon the threaded portion 39 of the shaft 40. Guide bars 43 which are suspended between the two brackets 41 cause the rope guide to travel laterally, but prevent its rotation, and the bars are passed through perforated ears 44 on the rope guide. A guide pulley 45 is swiveled on the rope guide, and the rope is adapted to pass over the pulley and thence to the winding drum. For reversing the movement of the rope guide, I utilize the loose bevel gears 46 and 47, and the clutch device 48, the latter being capable of a sliding motion on the shaft 40. The gears 46 and 47, may either of them be driven from the clutch 48 by means of the actuating lever 49, which is pivoted at 50 to the frame. The actuating lever 49 may be operated, through the medium of the rope guide, by either of the two tappets 51 and 52, both pivoted on the bar 43, and connected by pivotal connection, with the actuating lever by the rod 53.

The operation of the rope guide will be apparent. As the rope guide travels in the direction of the arrow in Fig. 1, impelled by the action of the screw or worm 39, it "lays" the rope in uniform coils upon the winding drum. When the rope guide contacts with the tappet at the left in Fig. 1, this tappet through the medium of the rod 53 will shift the actuating lever causing the sleeve 48 to slide toward the left on the shaft 40. This action disengages the clutch from the gear 47, and engages the clutch with gear 46, reversing the rotation of the shaft 40 and causing the rope guide to travel toward the right again. The same action and movement take place when the rope guide contacts with the tappet at the right. Each tappet has a spring 54 attached thereto and to one of the rods or bars 43, by means of which the tappets are held off center, and the clutch thrown over.

By keying the drum on the shaft 2, I am enabled to operate the rope guide at all times when the drum is rotating, and when the drum is at rest, the rope guide is likewise inoperative.

Having thus fully described my invention, it will be apparent that I have provided an efficient machine for performing the functions which are enumerated as the objects of my invention.

What I claim as new and desire to secure by Letters Patent is:—

1. The combination with a winding drum and a clutch mechanism therefor and a circular rack on the drum and a pawl therefor, of an actuating lever for said clutch operatively engaging said pawl, and trip mechanism comprising a trip lever formed with an end hook, a weighted lever suspended in said hook, and a pull cord connecting said weighted lever and the clutch lever, whereby said actuating lever is pulled when said weighted lever is freed.

2. The combination with a winding drum and release mechanism of trip mechanism comprising a track, a sleeve adjustably secured on the track, a trip lever pivoted in said sleeve and formed with an end hook, a second adjustable sleeve on the track, a weighted lever pivoted therein and supported in said end hook, and a pull cord connecting said weighted lever with the release mechanism, whereby said release mechanism is actuated to free the drum when said weighted lever is freed.

3. The combination with a winding drum and a clutch mechanism therefor, a circular rack on the drum and a pawl therefor, of an actuating lever for said clutch operatively engaging said pawl, trip mechanism comprising a track a sleeve adjustably secured on the track and a trip lever pivoted in said sleeve and formed with an end hook, a second adjustable sleeve and a weighted lever pivoted in said sleeve and supported in said end hook, and a pull cord connecting said weighted lever and the clutch lever, whereby said actuating lever is pulled when said weighted lever is freed.

In testimony whereof I affix my signature in presence of two witnesses.

THOMAS F. TALLON.

Witnesses:
ARCHER K. FRANK,
H. S. FORD.